[12] United States Patent
Várnai

[10] Patent No.: US 6,527,472 B1
[45] Date of Patent: Mar. 4, 2003

[54] DEVICE FOR MAKING DETACHABLE TUBE-JOINT

[76] Inventor: Nándor Várnai, H-7622 PÉCS, Dohány u. 7 (HU)

[*] Notice: Subject to any disclaimer, the term of this patent is extended or adjusted under 35 U.S.C. 154(b) by 0 days.

[21] Appl. No.: 09/700,013
[22] PCT Filed: May 6, 1999
[86] PCT No.: PCT/HU99/00037
§ 371 (c)(1),
(2), (4) Date: Nov. 3, 2000
[87] PCT Pub. No.: WO99/58862
PCT Pub. Date: Nov. 18, 1999

[30] Foreign Application Priority Data

May 8, 1998 (HU) ............................... 9801039
May 8, 1998 (HU) ............................... 9801040

[51] Int. Cl.[7] .................................. F16B 2/14
[52] U.S. Cl. ..................... 403/370; 403/372; 403/374.3
[58] Field of Search ................. 403/367, 368, 403/370, 371, 373, 374.2, 374.3, 374.4

[56] References Cited

U.S. PATENT DOCUMENTS

| | | | |
|---|---|---|---|
| 2,308,542 A | | 1/1943 | Raybould |
| 3,633,949 A | * | 1/1972 | Pfluger ................ 403/374.2 X |
| 3,865,095 A | * | 2/1975 | Helmick ............... 403/374.2 X |
| 4,903,924 A | | 2/1990 | Rutsche et al. |
| 6,332,735 B1 | * | 12/2001 | Wang ........................ 403/371 |
| 6,394,692 B1 | * | 5/2002 | Lin ............................ 403/371 |

FOREIGN PATENT DOCUMENTS

| | | |
|---|---|---|
| DE | 21 04 434 A | 8/1972 |
| DE | 2104494 | 8/1972 |
| DE | 23 26 640 A | 12/1974 |
| DE | 24 60 382 | 6/1976 |
| DE | 24 60 589 | 6/1976 |
| DE | 26 32 696 | 1/1978 |
| EP | 0 477 707 A1 | 1/1992 |
| FR | 1 278 327 A | 4/1962 |

* cited by examiner

Primary Examiner—Lynne H. Browne
Assistant Examiner—John R. Cottingham
(74) Attorney, Agent, or Firm—Welsh & Katz, Ltd.

(57) ABSTRACT

The invention is a device for making a detachable tube-joint for example, for supporting structures, gas and liquid transportation pipes; the said device comprising an at least partly threaded shank (1) with a ring (2, 3, and 20, 30) at both ends and an appliance for moving the shank (1), located at the central part of the shank(1), one of the rings (2, 3 and 20, 30) being threaded and connected to the shank (1) by the thread, and both rings (2, 3 and 20, 30) pressing a springing retainer (4, 5 and 40, 50) to the internal wall of the tube (7a, 7b), and the end surface (4b, 5b and 40b, 50b) of the retainer (4, 5 and 40, 50) resting on a supporting surface perpendicular to the axis (14), wherein the springing retainer (4, 5) has a tubular shape outside and a hollow inside and the springing (4, 5) retainer has a coned surface (4c, 5c) inside, and it has a slit (4a, 5a) along at least one of its generating lines, the ring (2, 3) is placed inside the retainer (4, 5) and the rings (2, 3) are equipped with balls (9) on their outside, resting on the internal coned surface (4c, 5c) of the retainers (4, 5) and the device has a construction preventing the threaded ring (2) and the respective retainer (4) belonging to this threaded ring (2) turning away with respect to each other, or the springing retainer (40, 50) is made of an elastic material and is placed around the ring (20, 30), and both rings (20, 30) are constructed in a way suitable for gripping the respective elastic retainers (40, 50) and suitable for the axial compression of the retainer (40, 50) while the shank (1) is moving.

12 Claims, 6 Drawing Sheets

DEVICE FOR MAKING DETACHABLE TUBE-JOINT

Figure 1:
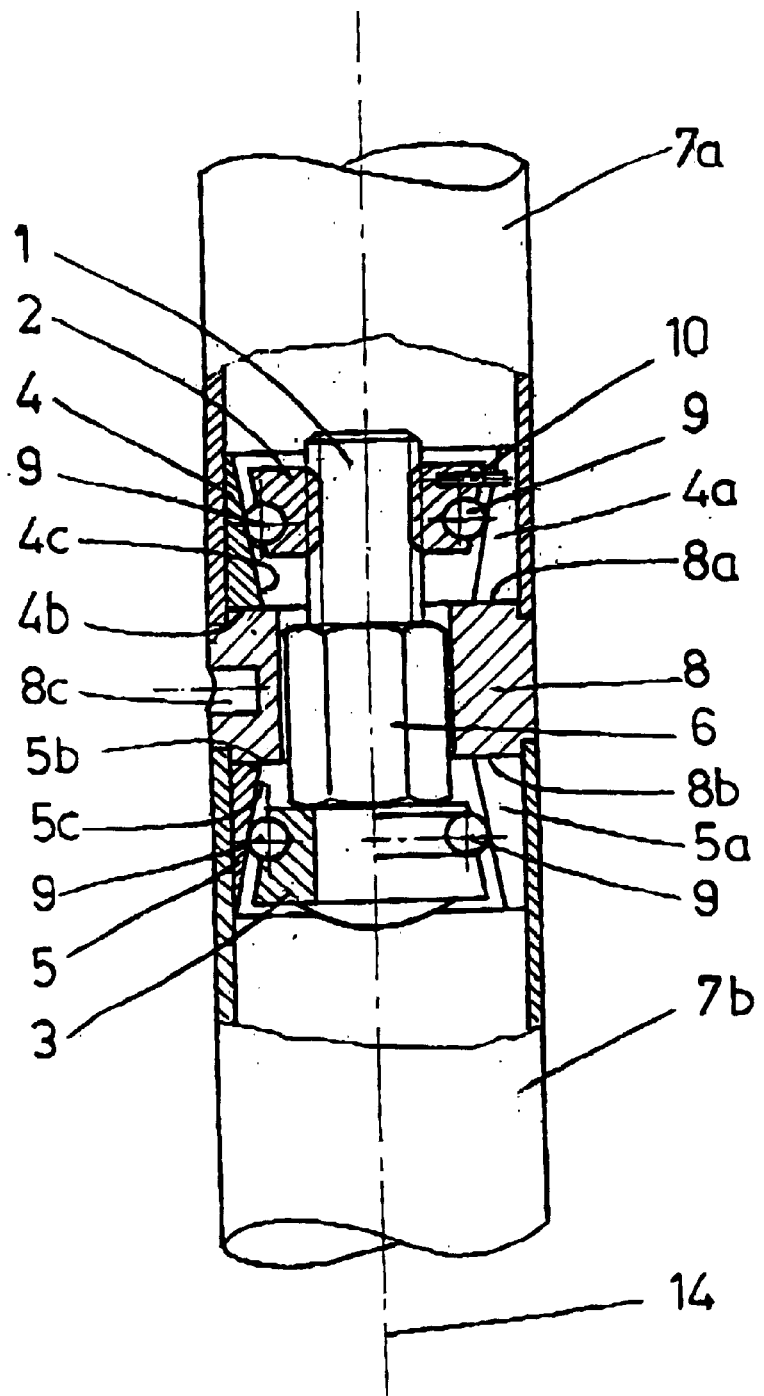

The subject of the invention is a device for marking a detachable tube-joint, for example, for supporting structures, gas and liquid transportation pipes; the said device comprising an at least partly threaded shank with a ring at both ends and an appliance for moving the shank, located at the central part of the shank, one of the rings being threaded and connected to the shank by the thread, and both rings pressing a springing retainer to the internal wall of the tube, the end surface of the retainer resting on a supporting surface perpendicular to the axis. The device according to the invention is suitable for enabling the quick assembly of the tubes of supporting structures, e.g. of tubular furniture; it may be used, however, for any application requiring the accurate, stable securing in a specific position, of tubes or various appliances placed on tubes, so that the tube-joint is aesthetic and easily and quickly fitted together. Tubular systems assembled with the device according to the invention have a high load-bearing capacity and are easily made suitable for the transportation of gases or liquids, also.

Various solutions are known for the assembly of tubes. Such solutions are presented, for example, in patent descriptions DE-A-2 326 640, U.S. Pat. No. 4,903,924, EP 477 707 and HU 213285. For this latter example, the joining of the tubes is made possible by a device comprising rings, coned on the outside, and retainers, coned on the inside and slit along a generating line that can be pushed apart by the rings, both being located on a threaded shank, as well as a propelling appliance located at the middle of the shank, one of the rings connected to the shank by a thread. Although this solution creates stable and aesthetic fastening, it has the disadvantage that, if the propelling appliance is tightened too hard, the coned rings may get stuck inside the coned retainers, which makes detachment troublesome.

The object of the invention is the creation of a device, by eliminating the said disadvantage, which enables the making of a stable and aesthetic joint between tubes, easy to join and to detach. A further object of the invention is ensuring that it can be applied for joining pipes used for the transportation of liquids and gases.

The invention is based on the recognition that the desired goal may be achieved if, in the solution according to the above-mentioned patent description HU 213285, the ring is not coned and the stressing force is not generated between the touching cones; instead, the rolling points of the balls convey the stressing force from the ring to the retainer, slit along its generating line or, if the ring is not coned, and the stressing force is not generated between the touching cones; instead, the retainer itself is made of an elastic material, pressing against the tubes to be connected when pressed together. In the case of pipes used for the transportation of liquid or gas, a solution to ensure free flow inside the shank of the connection device as well as appropriate sealing at the joints is established.

The invention is, therefore, a device for making a detachable tube-joint, for example, for supporting structures, gas and liquid transportation pipes; the said device comprising an at least partly threaded shank with a ring at both ends and an appliance for moving the shank, located at the central part of the shank, one of the rings being threaded and connected to the shank by the thread, and both rings pressing a springing retainer to the internal wall of the tube, the end surface of the retainer resting on a supporting surface perpendicular to the axis, the springing retainer being of a tubular shape on the outside, i.e. of a shape fitting that of the tube, whereas inside it is hollow and the springing retainer has a coned surface inside as well as a slit along at least one of its generating lines, the ring being placed inside the retainer and are equipped with balls on their outside, resting on the coned internal surface of the retainers and the device has a construction preventing the turning away of the threaded ring and the respective retainer belonging to this threaded ring with respect to each other, or the springing retainer is made of an elastic material and is placed around the ring, both rings being constructed in a way suitable for gripping the respective elastic retainers and suitable for the axial compression of the retainer while the shank is moving, and in case of necessity, there is an axial bore-hole inside the shank.

It should be noted that, for the purpose of the interpretation of the invention, the threaded joint of the threaded ring to the shank is to be deemed equivalent to any other joint resulting in the longitudinal movement of the ring from the rotating movement of the shank.

If, in the solution according to the invention, the rings are equipped with balls on their outside, resting on the internal coned surface of the retainers, and the device has a construction preventing the turning away of the threaded ring and the respective retainer belonging to this threaded ring with respect to each other, it is practical if the appliance for the movement of the shank is constituted by a carrier device and a propelling unit for the movement of the carrier device, the carrier device is located on the shank and designed in a shape-locking way, preferably bordered by planes, and the diameter of the propelling unit preferably is equal with the external diameter of the tubes to be fitted together, and it is also practical if supporting surfaces for supporting end surfaces of the retainers, perpendicular to the axis, are located on the appliance used for the movement of the, shank, e.g. on its propelling unit.

In a preferred embodiment of the invention, a pivot is used for the prevention of the turning away of the threaded ring and the respective retainer with respect to each other, with one end secured inside the threaded ring and the other fitted into the slit along the retainer.

It may happen that a supporting appliance or a fitting is to be positioned at the tube-joint, possibly so it may be revolved. This is facilitated by the use of a spacer between the propelling unit and one of the retainers, for the positioning of fittings. Using a spacer, it is possible to connect tubes placed further away from each other.

In the case of pipes for gas or liquid transportation, a bore-hole is constructed in the shank in order to ensure free flow and the propelling unit is connected to the ends of the pipes, that means tubes, preferably through sealing rings in order to achieve the appropriate seal.

The device according to the invention is easily detachable from the tube ends. In the case of the irregularities of the figured surfaces, other methods may have to be used to facilitate detachability. This purpose could be served, for example, by the construction of an indent on the coned surface of the retainers as well as of raised collars on the propelling unit, the collars being clicked into the said indents.

If the springing retainer is made of an elastic material and is placed around the ring both rings being constructed in a manner suitable for gripping the respective elastic retainers as well as for the axial compression of the retainer while the shank is moving, it is practical if the ring is constituted by two opposing pieces sliding inside one another, equipped with a flange and a sheath, where the sheath of the first piece is threaded on the shank, whereas the sheath of the second piece is threaded on the first piece, and the thread is constructed inside the sheath of the first piece of the threaded ring connected to the shank.

Further, it is practical if the appliance for the movement of the shank is constituted by a carrier device, constructed in a shapelocking way, favourably bordered by planes, and a propelling unit for the movement thereof, the diameter of the propelling unit favourably being equal with the external diameter of the tubes to be fitted together; further, if, at the same time, there is on the appliance used for the movement of the shank, e.g. on its propelling unit, a supporting surface supporting, perpendicular to the axis, the flanges of the second pieces of the rings, and the flanges support the end surfaces of the elastic retainers perpendicular to the axis.

Using the device according to the invention, a safe and aesthetic tube-joint can very easily and quickly established, the detaching also being quick and easy as the device does not seize. The connection requires no treatment on the tubes, which can be secured in any position rotated around their axis. Further, the device may be applied to the connection of liquid and gas transportation pipes. The device can further be applied to the connection of other than cylindrical tubes, e.g. for quadrangle-section tubes as well.

In the following, drawings are used to present examples of the invention in more detail.

FIG. 1: A section of an embodiment of the device according to the invention, having a retainer, slit along its generating line.

Figure 2:
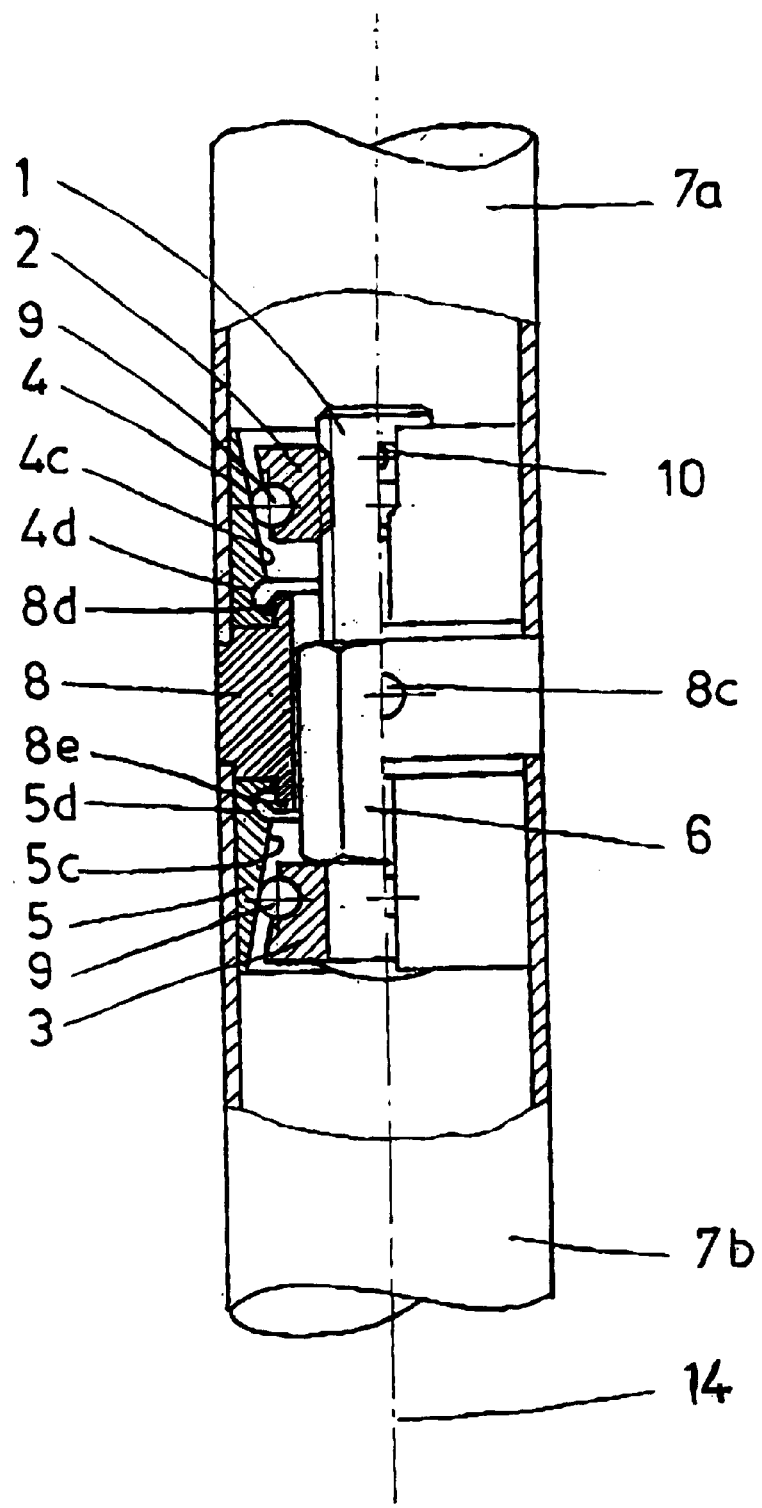

FIG. 2: Half-view, half-section of another embodiment of the device according to the invention, having a retainer, slit along its generating line.

Figure 3:
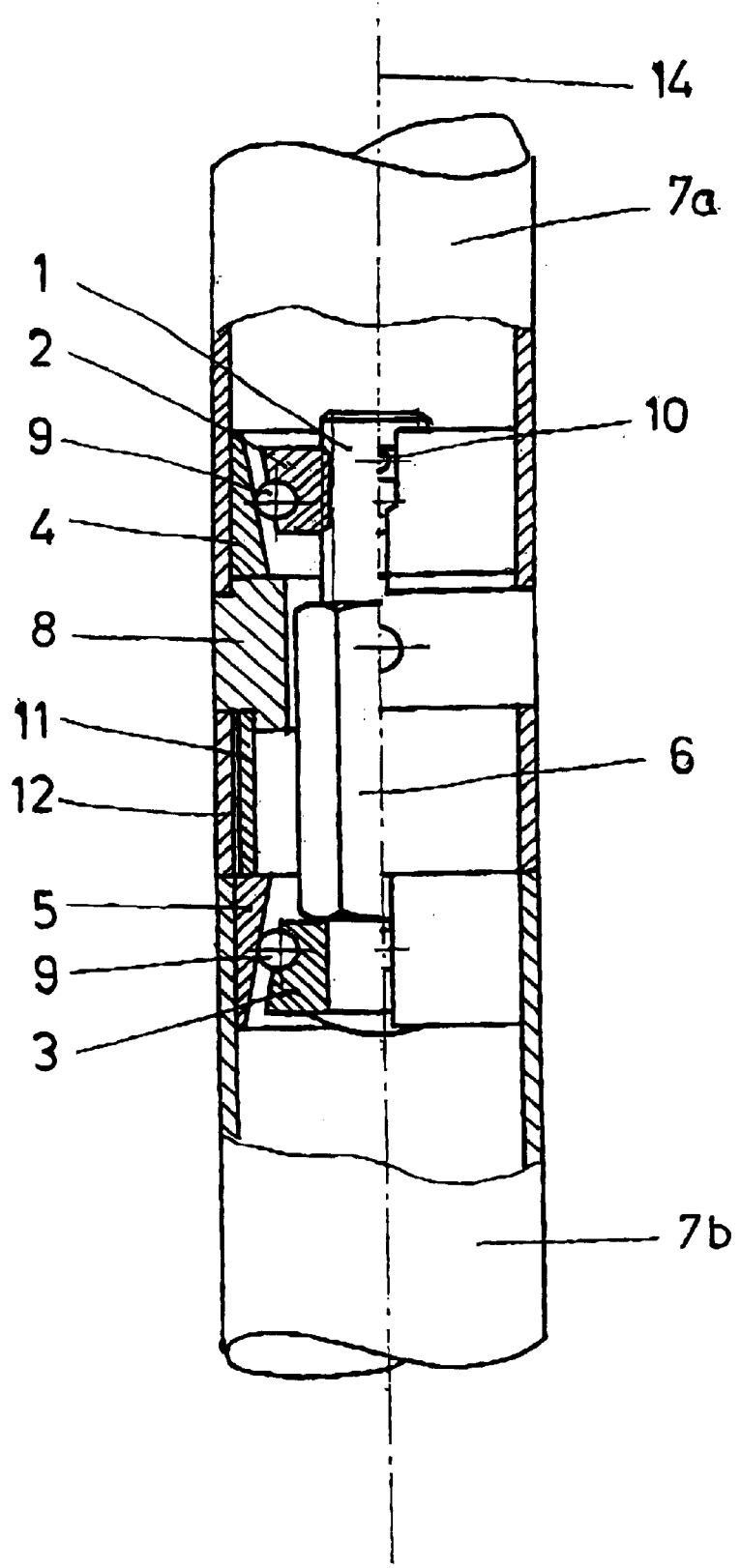

FIG. 3: Half-view, half-section of a further embodiment of the device according to the invention, having a retainer, slit along its generating line.

Figure 4:
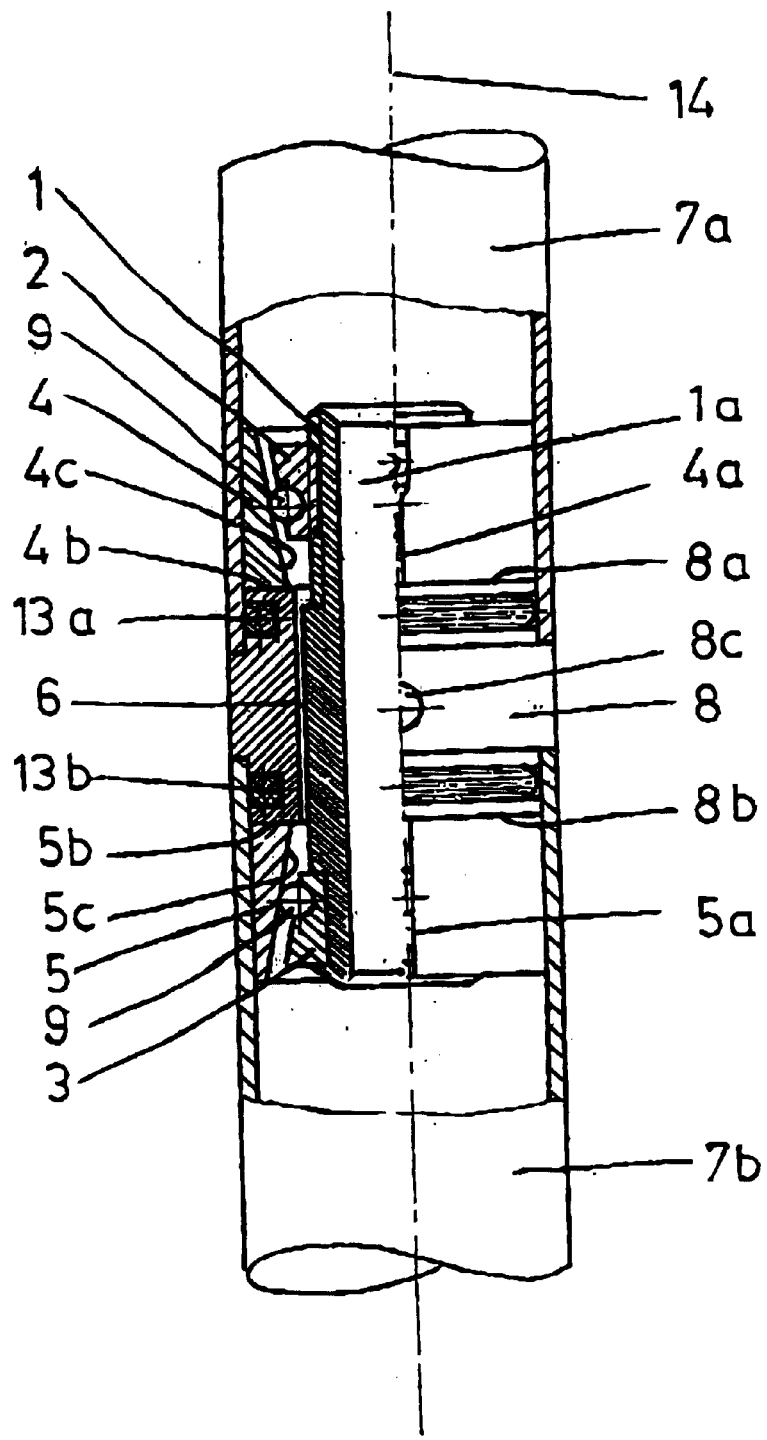

FIG. 4: Half-view, half-section of a further embodiment of the device according to the invention, having a retainer, slit along its generating line.

Figure 5:
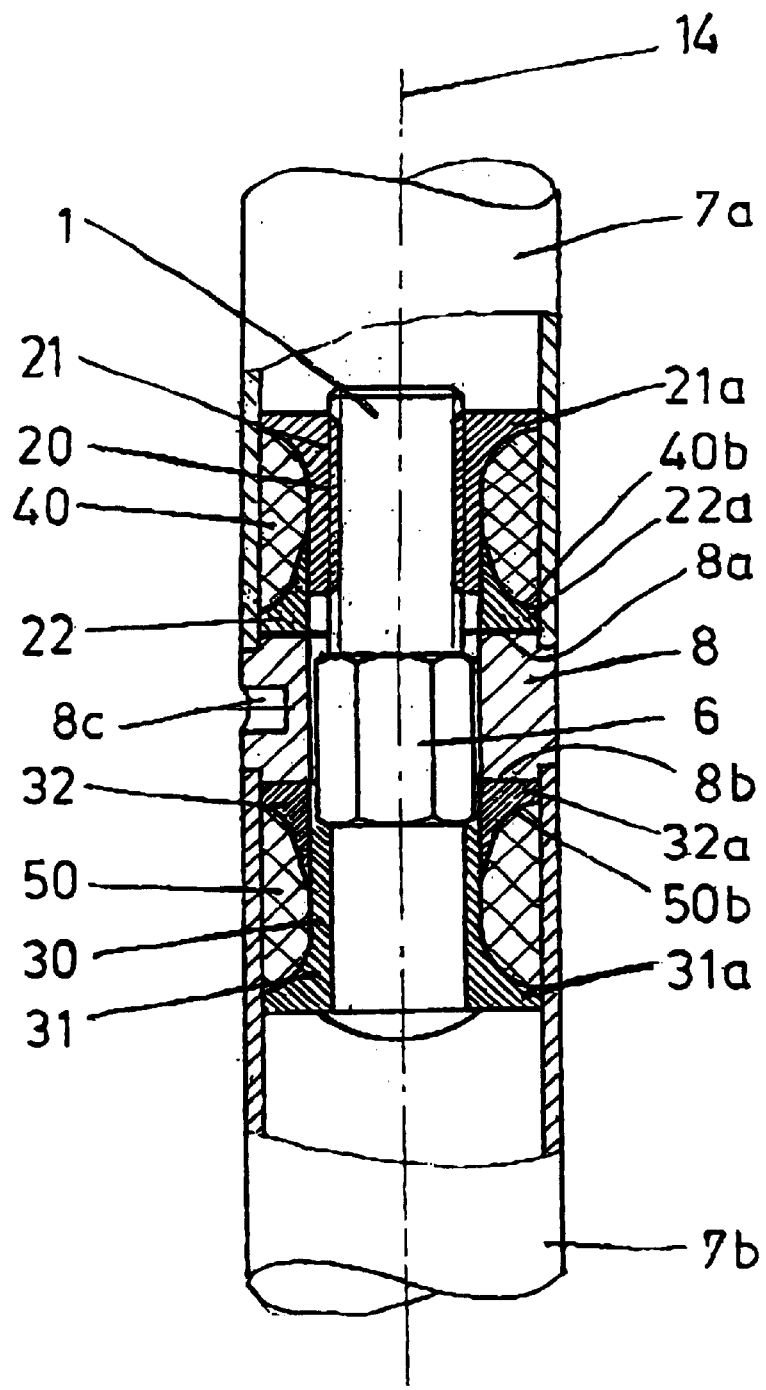

FIG. 5: A section of an embodiment of the device according to the invention, having a retainer made of an elastic material.

Figure 6:
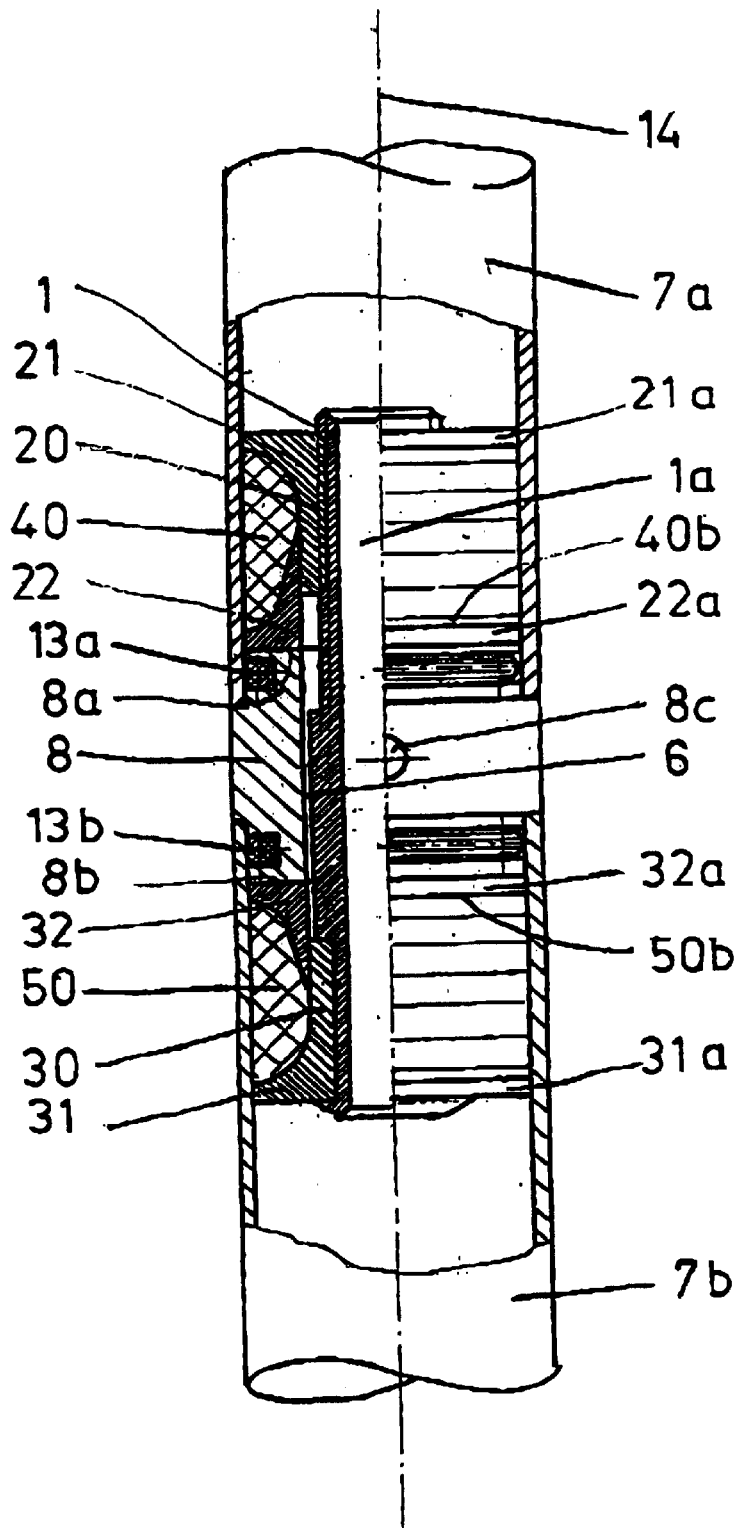

FIG. 6: Half-view, half-section of another embodiment of the device according to the invention, having a retainer made of an elastic material.

FIG. 1 shows a section of the embodiment of the device according to the invention. The device, connecting the ends of tubes 7a and 7b, comprises the following parts. The upper part, according to the drawing, of shank 1 is threaded up to the carrier device 6. Rings 2 and 3, with balls 9 placed inside their cavities, are positioned on shank 1. Practically, several evenly distributed balls belong to a ring. Ring 2 is connected to shank 1 by a thread, whereas ring 3 is positioned on shank 1 by a loose fit, supported at the flaring-out end of shank 1. Retainer 4 and 5 are cylindrical on the outside and hollow inside, having a coned surface 4c and 5c and a slit 4a and 5a along at least one or several of their generating lines. Rings 2 and 3 are placed inside retainers 4 and 5. Balls 9 rest on the internal coned surface 4c and 5c of retainers 4 and 5, while being revolving. The turning away with respect to each other of the threaded ring 2 and the respective retainer 4 belonging to the ring 2 is prevented by a pivot 10, with one of its ends fastened inside ring 2, the other being fitted into the slit 4a along the retainer 4. The appliance for the movement of shank 1 comprises the carrier device 6, constructed in a shapelocking way, practically bordered by planes, and the propelling unit 8, capable of the movement of it. The carrier device 6 could be, for example, a threaded nut screwed up and fastened at the middle of shank 1. The external diameter of the propelling unit 8 is practically equal with the external diameter of tubes 7a and 7b to be joined, with collars constructed on it for tubes 7a and 7b. The carrier device 6, and thus the shank 1 can be rotated by the propelling unit 8, using, for example, a suitable tool that can be fitted into the blind hole 8c. The propelling unit 8 contains the supporting surface 8a and 8b for the supporting, perpendicular to the axis 14, of the end surfaces 4b and 5b of retainers 4 and 5. At the construction according to FIG. 1, rotating the propelling unit 8 also causes the shank 1 to rotate, which in turn makes rings 2 and 3 move closer to each other along the axis 14, with the respective balls 9 pressing the coned surfaces 4c and 5c of the retainers 4 and 5 outwards, causing the slits 4a and 5a to open wider and the retainers 4 and 5 to be pressed against the inner wall of the tubes 7a and 7b. On detaching, rotating the propelling unit 8 it the opposite direction causes the rings 2, 3 to move away from each other, reducing the pressure of balls 9 on the retainers 4 and 5, enabling the removal of the device.

The embodiment presented in FIG. 2 includes a further measure as compared to FIG. 1, in order to ensure the ease of the detachment. This solution is practical whenever the device contains inaccuracies in its finishing, surface irregularities, ovality, eccentricity, etc. As shown, indents 4d, 5d are constructed on the coned surface 4c, 5c of the retainers 4 and 5 as well as protruding collars 8d, 8e are constructed on the propelling unit 8, with indents 4d, 5d clicked thereon, enabling the even easier removal of the device from tubes 7a and 7b.

The embodiment shown in FIG. 3 has a spacer 11 added, with respect to FIG. 1, between the propelling unit 8 and one of the retainers 4 and 5, in this case retainer 5. On the spacer 11, for example a tube section 12 could be positioned, e.g. with a fitting attached to it in a revolving fashion, in case of necessity. Applying the appropriate lengths of the tube section 12, tubes 7a, 7b, at various distances, could be connected.

The embodiment shown in FIG. 4 has a bore-hole 1a added, with respect to FIG. 1 in the shank 1 for the purpose of gas or liquid transportation, and the propelling unit 8 is equipped with indents to hold the sealing rings 13a, 13b, the propelling unit 8 connecting to the ends of tubes 7a, 7b via these sealing rings.

FIG. 5 shows an embodiment of the device according to the invention, where the retainers 40 and 50 are made of an elastic material. The device, connecting the ends of tubes 7a and 7b, comprises the following parts. The upper part, according to the drawing of shank 1 is threaded up to the carrier device 6. Ring 20 is connected to shank 1 by a thread, whereas ring 30 is positioned on by a loose fit. Retainers 40 and 50 surround rings 20 and 30 in a circular layout. The appliance for the movement of shank 1 comprises the carrier device 6, constructed in a shape-locking way, favourably bordered by planes, and the propelling unit 8, capable of the movement of it. The carrier device 6 could be, for example, a threaded nut bolted up and fastened at the middle of shank 1. The diameter of the propelling unit 8 is practically equal with the external diameter of tubes 7a and 7b to be joined. The carrier device 6, and thus the shank 1 can be rotated by the propelling unit 8, using for example, a suitable tool that can be fitted into the blind hole 8c. The propelling unit 8 contains the supporting surfaces 8a and 8b for the supporting the flanges 22a and 32a of the pieces 22 and 32, the other sides of these flanges supporting, in turn, the end surfaces 40b and 50b of the retainers 40 and 50. The rings 20 and 30 are constituted by a pair of opposing sheathed pieces 21, 22 and 31, 32, sliding inside one another, equipped with a flange 21a, 22a and 31a, 32a, where the sheaths of the first pieces 21 and 31 are threaded on the shank 1, whereas the sheaths of the second pieces 22 and 32 are threaded on the first pieces 21 and 31, the thread being constructed inside the sheath of the first piece 21 of the threaded ring 20, connecting to the shank 1. In the construction according to FIG. 5, rotating the propelling unit 8 also causes the shank 1 to rotate, which in turn makes the first pieces 21 and 31 of the rings 20 and 30 move closer to each other along the axis 14, while pressing the retainers 40 and 50 together, causing them to press against the inner wall of the tubes 7a and 7b as well as against the pieces, thus creating the joint.

On detaching, however, rotating the propelling unit 8 in the opposite direction causes the first pieces 21, 31 to move away from each other, reducing the pressure on the retainers 40 and 50, enabling the removal of the device.

The embodiment shown in FIG. 6 has a borehole 1a inside the shank 1 added, with respect to FIG. 5, for the purpose of gas or liquid transportation. Using this solution, further sealing is not necessarily required. In case of necessity, however, a sealing solution similar to the one shown in FIG. 4 could be used here as well, also shown in this FIG. 6. The device according to the invention may be designed in a number of versions within the protected scope, including embodiments different from the examples presented above.

What is claimed is:

1. A device for making a detachable tube-joint for joining a first tube opposite a second tube; said device comprising an at least partly threaded shank with a first ring at one end and a second ring at an opposite end; the shank being rotatable; said first ring being threadedly connected to the shank; said first ring, pressing an associated springing first retainer to an internal wall of the first tube; said second ring pressing an associated springing second retainer to an internal wall of the second tube; an end surface of each of said first and second retainer resting on a supporting surface perpendicular to an axis of the device; the first and second retainer having a tubular shape outside and a hollow with a coned surface inside; said first and second retainer having a slit along at least one of the generating lines of the first and second retainer, the first ring being placed inside the first retainer and the second ring being placed inside the second retainer, the first retainer being in said first tube, while said second retainer with the second ring is placed in said second tube, wherein said first and second ring have balls on their outside, resting on the coned surface of the first and second retainers and the device further comprising connecting means connecting the first ring to the first retainer for preventing turning away of the first ring and the first retainer with respect to each other, and by rotating the shank said first and second rings move closer to each other along the axis and through the balls press the first and second retainers, respectively, to the inner wall of the first and second tubes, respectively.

2. The device according to claim 1, wherein balls are placed in cavities formed in the rings.

3. The device according to claim 1, wherein the shank is rotatable through a propelling means and the carrier device, said carrier device is being fastened on the shank, the carrier device having exterior surfaces and the propelling means having interior surfaces which surfaces being generally conform to the exterior surfaces of the carrier device to provide a joint turning of the propelling means and the carrier device; and external diameter of the propelling means being generally equal with the external diameter of first and second tube, and the propelling means having a supporting surface for supporting an end surface of the first and second retainer.

4. The device according to claim 1 wherein the connecting means comprises a pivot that prevents the turning away with respect to each other of the threaded ring and the associated first retainer, one end of said pivot being secured inside the first ring, an opposing end fitted into the slit along the first retainer.

5. The device according to claim 3 wherein a spacer is between the propelling unit and one of the first and second retainers.

6. The device according to claim 3 wherein the propelling means is connected to the ends of each of the first and second tubes through sealing rings.

7. The device according to claim 1 wherein indents are constructed on the coned surfaces of the first and second retainers and raised collars are constructed on the propelling unit, and the collars are fitted into the indents.

8. The device according to claim 1, wherein an axial bore-hole is inside the shank.

9. A device for making a detachable joint for connecting a first tube to a second tube, said device comprising an at least partly threaded shank with a first and second ring at opposite ends and a means for rotating the shank, said first ring being threadedly connected to the shank, and said first ring pressing a first springing retainer to an internal wall of said first tube, said second ring pressing a second springing retainer to an internal wall of said second tube and end surfaces of said first and second rings resting on a respective supporting surface perpendicular to an axis of said device, and the first and second retainer having a substantially tubular exterior shape on and a hollow interior, the first retainer with the first ring is placed in the first tube, and the second retainer with the second ring is placed in the second tube, wherein the first and second springing retainer is an elastic material and placed around each of first and second ring, said first and second rings capable of gripping the first and second retainers and axially compressing the first and second retainers respectively while the shank is rotating.

10. The device according to claim 9, wherein each of said first and second rings comprises a pair of telescoping opposing pieces, each said piece having a flange and a sheath, the sheath of a first piece being positioned on the shank and the sheath of a second piece being positioned on the first piece, the thread being in the sheath of the first piece.

11. The device according to claim 10, wherein the means for rotating the shank comprises a carrier device and a propelling means for rotating the carrier device, the carrier device being located and fastened on the shank and conforming to an interior surface of the propelling means for providing a joint turning of the propelling means and the carrier device, an external diameter of the propelling means being substantially equal with an external diameter of the first and second tubes; and the means for rotating the shank having a surface for supporting, perpendicularly to the axis, the flanges of the second pieces of the rings.

12. The device according to claim 9, wherein an axial bore-hole is inside the shank.

* * * * *